J. K. WILLIAMS.
APPARATUS FOR MANUFACTURING WHEEL TIRES.
APPLICATION FILED APR. 1, 1909.

943,054.

Patented Dec. 14, 1909.
2 SHEETS—SHEET 1.

Witnesses:
Glenara Fox
Kathryn Brenneman

Inventor
John K. Williams
by C. E. Humphrey
Atty.

J. K. WILLIAMS.
APPARATUS FOR MANUFACTURING WHEEL TIRES.
APPLICATION FILED APR. 1, 1909.

943,054. Patented Dec. 14, 1909.
2 SHEETS—SHEET 2.

UNITED STATES PATENT OFFICE.

JOHN K. WILLIAMS, OF AKRON, OHIO, ASSIGNOR OF ONE-HALF TO THE WILLIAMS FOUNDRY AND MACHINE COMPANY, OF AKRON, OHIO, A CORPORATION OF OHIO.

APPARATUS FOR MANUFACTURING WHEEL-TIRES.

943,054.  Specification of Letters Patent.  Patented Dec. 14, 1909.

Application filed April 1, 1909. Serial No. 487,272.

*To all whom it may concern:*

Be it known that I, JOHN K. WILLIAMS, a citizen of the United States, residing at Akron, in the county of Summit and State of Ohio, have invented new and useful Improvements in Apparatus for Manufacturing Wheel-Tires, of which the following is a specification.

This invention relates to apparatus for manufacturing and repairing rubber articles such as vehicle wheel tires, more particularly tires of the clencher type and the object thereof is to provide a vulcanizing mold to receive the article, preferably provided with a mandrel to sustain said article, with a portion of the interior of said mold provided with a recess or opening adjacent the article and with one or more layers of material which is pervious to a heating agency positioned between said recess and the article and preferably conforming in contour to the conformation desired to be imparted to the latter during vulcanization.

A further object of the invention is to so construct the device that the heating agency will have free access to the pervious material for permitting it to act directly on the rubber article to insure effectual vulcanization thereof.

With the foregoing and other objects in view, the invention consists in the novel construction, combination and arrangement of parts constituting the invention to be hereinafter specifically described and illustrated in the accompanying drawings which form a part hereof wherein is shown the preferred embodiment of the invention, but it is to be understood that changes, variations and modifications can be resorted to which come within the scope of the claims hereunto appended.

Figure 1:
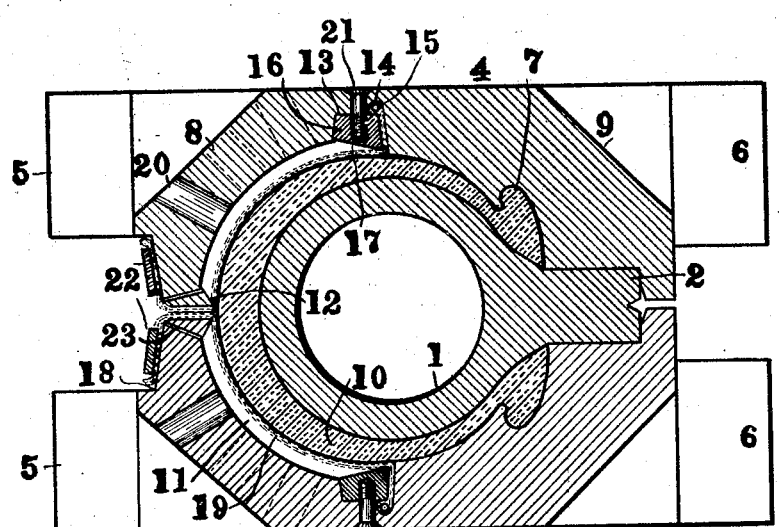
Figure 2:
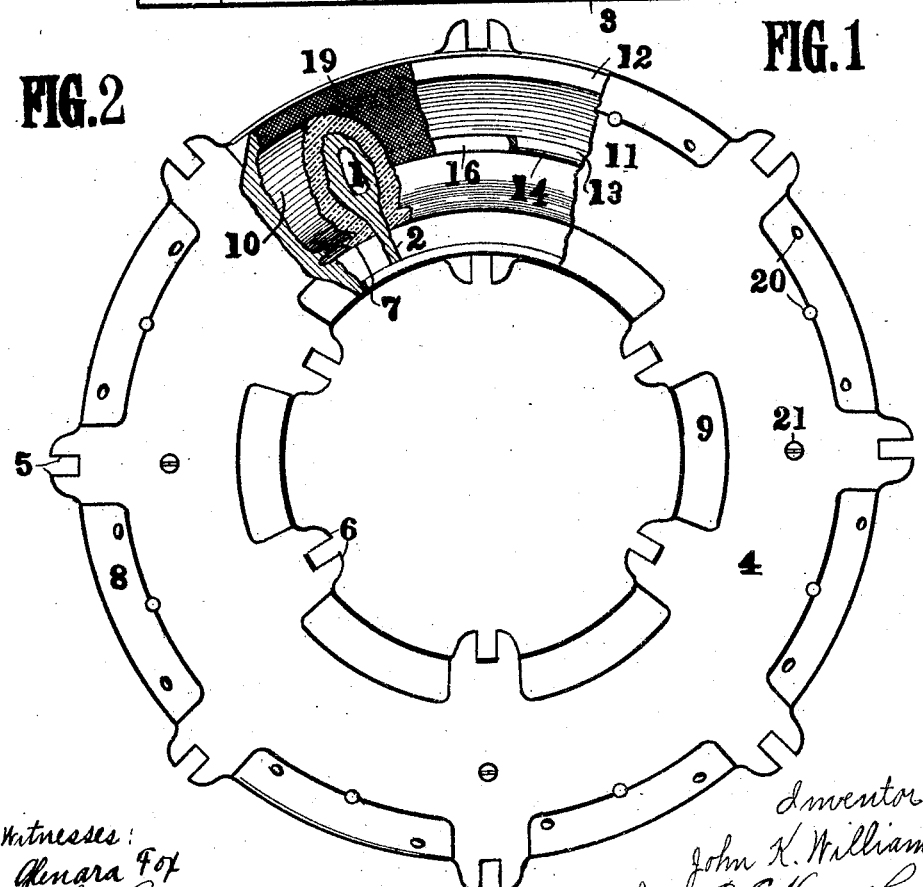
Figure 3:
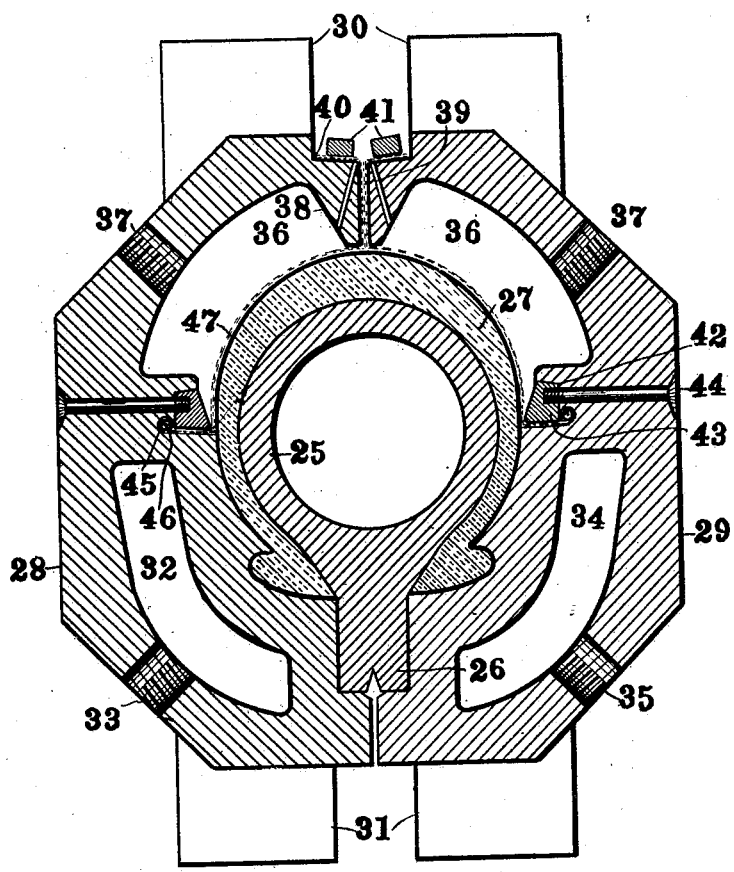

In the drawings, in which similar reference numerals indicate like parts in the different figures: Figure 1 is a transverse sectional view of a vulcanizing mold with a tire in position therein mounted upon a suitable mandrel. Fig. 2 is a plan of a two-part mold embodying this invention with portions thereof broken away to better illustrate the construction thereof; and, Fig. 3 is a transverse sectional view of a slight modification of the mold shown in Fig. 1 with a tire positioned therein mounted upon a suitable mandrel.

Referring to Figs. 1 and 2 of the drawings, the reference numeral 1 denotes an annular core or mandrel having the shape in cross section which it is desired to impart to the interior of the completed tire, the inner portion of which is provided with an inwardly-projecting flange 2 which serves to strengthen the same and provides means to receive and limit the movement of the mold sections when the same are clamped together preparatory to vulcanizing the tire, and this flange also constitutes means for accurately maintaining the position of the core 1 in the mold during the vulcanization of the tire. The mold sections referred to by the reference numerals 3 and 4 are intended to occupy positions on opposite sides of the core, and are provided at intervals with registering pairs of outwardly-projecting lugs 5 and inwardly-projecting pairs of lugs 6, the members of each pair of lugs being spaced apart from each other to permit the placing between them of clamping bolts which extend from the registering lugs on one member to the lugs on the other member for clamping said sections together, but as this is a common means of uniting mold sections and fully understood by persons skilled in this art, a further description thereof is believed to be unnecessary. The inner oppositely-disposed faces of the mold sections adjacent the core 1 are shaped to receive and hold the shoe portion 7 of a tire during the vulcanization thereof. Both of the mold sections 3 and 4 are reduced at 8 and 9 in order to make it easier for the heat of vulcanization to radiate easily and quickly to the tire contained in the mold. The inner face of the mold opposite the tread of the tire 10 is provided with a recess 11, preferably extending continuously around the entire tread of the tire.
In constructing the mold sections with a recess in each, each section may be provided with a marginal flange 12 or these flanges may be omitted and the recesses in the two mold sections form an uninterrupted cavity, the former construction shown in Fig. 1 being the preferred one. The mold sections are each further provided with a circumferentially-extending groove 13, said grooves being approximately oppositely disposed to each other and each provided in the outer face thereof with smaller annular grooves 14 in each of which is seated a hoop or ring 15 usually formed of heavy wire. Arranged to be seated in each groove 13 is a ring 16, the inner face 17 thereof inclined. The oppositely-disposed portions of the mold sections opposite the tread of the tire are preferably slightly separated and the outer peripheral face of each section has an inclined face 18 to hold a clamping ring 22 for a purpose to be stated.

The invention contemplates positioning in the recess 11 one or more layers 19 of a pervious material to cover the outer tread surface of the tire and constitute a sustaining means for the latter of sufficient firmness to maintain it in proper shape and conformation during the softening thereof incident to vulcanization and exert sufficient pressure thereon to cause a perfect union between the various portions of the tire to cause them to intimately unite; at the same time said layers will be such as to permit a vulcanizing agent conducted thereto through suitable openings 20 to effectually vulcanize the selected portion of the tire. In positioning these layers, one edge of each layer will be placed in the respective groove 14 and held there by one of the rings 15, after which one of the rings 16 is placed in the appropriate groove 13 which forces the wire hoops 15 firmly into clamping engagement with the layers 19 thereby locking them firmly in position. The rings 16 are each preferably held in position and clamped firmly in their seats through the medium of holdfast devices 21. The grooves 13 are preferably made sufficiently wide so that when the rings 16 are seated therein the layers 19 may extend outwardly into the mold cavity and from thence be carried upwardly through the space between the portions of the mold sections adjacent the tire tread and from thence bent outwardly onto the inclined faces 18. Each ring 22 is then placed in position which clamps the layers 19 on the respective face 18, thus effectually holding the layers 19 in position. It will be stated that in forming the layers 19 and shaping them previous to their actual use, a suitable form is employed corresponding to the shape which is to be imparted to the finished tire. The openings 20 for the admission of vulcanizing agent are preferably arranged in rows with the openings in adjacent rows in staggered relation with respect to the openings in the other rows.

The mold sections 3 and 4 are necessarily separated from each other before the placement of the layers 19 therein and each is prepared separately by employing a form or dummy, as before described, for shaping the layers and after the latter have been shaped and securely fixed in position, an unvulcanized article properly built up on a core is placed between the sections and the two sections clamped together by bolts, (not shown) extended between the oppositely-disposed lugs of adjacent sections which firmly clamp the mold sections upon the unvulcanized tire and also upon the flange 2 of the core, thus securely holding it in position and against movement during vulcanization. The entire mold is then placed in a vulcanizing oven and subjected to the action of a vulcanizing agent which enters the various openings 20 and passes to all portions of the recesses 11 and from thence through the layers 19 of pervious material directly to the portion of the tire covered by this material, which is thereby effectually vulcanized, while at the same time heat is also transmitted to the balance of the tire through the material of which the mold sections are composed. When the molds are placed in the vulcanizing oven they are customarily laid on either of their sides as shown both in Figs. 1 and 2, and as the vulcanizing agent usually employed is live steam, a considerable condensation of the same takes place in the recesses 11, due to the contact of the live steam with the comparatively cold mold and its contents. The water due to condensation in the lower half of the mold which accumulates in the recess 11 on the under side, freely escapes through the openings 20 and thereby permits the live steam free access to the pervious material 19; but it will be seen that the recess 11 in the upper mold section cannot be drained through the openings 20 and hence suitable drainage tubes 23 are employed which extend from the recess 11 outwardly through the shell of the mold section to a suitable opening communicating with these drainage tubes 23 made through the pervious material to permit efficient drainage from the recess. In order to make both sides of the mold the same so that either section thereof may be placed uppermost in the vulcanizing oven, each of the mold sections is provided with a drainage tube 23. After vulcanization, the mold sections are separated in the usual manner, the article removed and a fresh one substituted in place of the one just vulcanized, without the necessity of changing the layer 19 of pervious material which may be used indefinitely and continuously until worn out.

In Fig. 3 is shown a modification of the apparatus shown in Figs. 1 and 2, in which the reference numeral 25 denotes a similar core provided with a projecting flange 26 on which is mounted the tire 27. Mold sections 28 and 29 are positioned in the same manner as has been described with reference to the mold sections in Figs. 1 and 2, each of which is provided with outwardly-extending pairs of lugs 30 and inwardly-extending pairs of lugs 31 corresponding in shape and function to the lugs 5 and 6 of the device shown in Figs. 1 and 2. The mold section 28 is provided with a circumferentially-extending steam chamber 32 to which steam is admitted through an opening 33 and the mold section 29 is similarly provided with a circumferentially-extending steam chamber 34 having an inlet 35. Each of the mold sections is provided with a recess 36, preferably made considerably larger than the recess 11 in the device shown in Figs. 1 and 2 and each is provided with a steam inlet opening 37. The abutting portions of the mold sections adjacent the tread of the tire are provided with inwardly-extending flanges 38, preferably so constructed as to be slightly spaced apart from each other when the sections are united and these flanges 38 are also provided with drainage openings 39. The outer peripheral faces of the mold sections between the series of lugs 30 are provided with inclined faces 40 to receive the clamping rings 41. The mold sections 28 and 29 are also provided with circumferentially-extending grooves 42 to receive rings 43 held in position by holdfast devices 44 and are further provided with annular grooves 45 adapted to receive wire rings 46. The pervious material 47 in this modification of the device is positioned in the same manner as shown in Figs. 1 and 2 by the clamping rings 42 and is carried upwardly and outward through the space between the members 28 and 29 and secured in position by clamping rings 41.

In employing a mold constructed in accordance with the foregoing description, the rubber article, in this instance is illustrated as a tire mounted on the mandrel 25, and the mold sections 28 and 29 are clamped onto the flange 26 through the medium of bolts extending between the lugs 30 and 31 and when positioned, steam is admitted to the chambers 32 and 34 through the medium of inlets 33 and 35 and also to the recesses 36 through the inlets 37 when a new tire is to be manufactured, without the necessity of placing the same in a vulcanizing oven.

If desired to repair a tire, either by curing a puncture therein or by placing a new tread on the carcass of the same, the tire is placed in the mold in the usual manner with either a new tread in position or the material which is to close a puncture inserted therein and steam is admitted to the steam chamber adjacent the selected portion of the tire which repairs it by vulcanizing the fresh material, and in the case of supplying a new tread to a tire, steam will be admitted to both the recesses 36. It will be seen from the foregoing that in the latter instance steam is employed only in the recess 36, leaving the balance of the mold comparatively cold so as not to overcure that portion which does not need further curing. It will also be seen that steam may be admitted to either of the recesses 36 or chambers 32 or 34 so as to cure the rubber in a selected portion of the tire if desired, without the necessity of placing the entire mold in a vulcanizing oven.

It will be noted that while the drawings and descriptions have been confined to a mold for vulcanizing pneumatic tires in which it is necessary to employ a mandrel or core to support the tire, it will be obvious that this invention may be applied to molds for vulcanizing any rubber article not requiring the employment of a core or mandrel. It is further entirely within the scope of this invention to change the shape of the core in order to adapt it to different types of rubber articles and a core may be employed without an inwardly-projecting flange, or in place of a core such as is shown in the drawings, an inflatable air bag may be used to sustain the inner cavity of the rubber article. Further, in view of the fact that it is now common practice to clamp the mold sections in a press, or by other clamping means instead of bolts, the latter may be omitted entirely and the mold sections placed in a press which holds them firmly in contacting relation during the vulcanization of an article, the lugs shown in the drawings to receive the bolts for clamping the mold sections being merely one of the various ways employed for holding the mold sections temporarily snugly together.

What I claim and desire to secure by Letters Patent is:—

1. A vulcanizing apparatus comprising a mold formed of a plurality of sections, each of said sections having as a component part thereof a lining of pervious material to permit of the passage therethrough of a vulcanizing medium, each of said linings secured to its respective section.

2. A vulcanizing apparatus comprising a mold formed of a plurality of sections, each provided with a recess to constitute a steam space, and a lining of pervious material forming a component part of each section, each of said linings forming the wall of a steam space, and each lining secured to its respective section, and each of said linings furthermore constituting a means to prevent the distortion of the article being vulcanized.

3. A vulcanizing apparatus comprising a pair of mold sections with registering cavities in their abutting faces to hold an article to be vulcanized, each of said sections provided with a recess communicating with the cavity therein, a layer of pervious material extending across each of said recesses and constituting approximately a continuation of the inner surface of said mold cavity and means to introduce a heating medium to said recesses.

4. An apparatus of the class described comprising a core or mandrel, mold sections provided with registering cavities arranged to surround a portion of an article mounted on said core, each of said mold sections provided with a recess communicating with the mold cavity thereof, a pervious covering for each of said recesses and means for introducing to each of said recesses a vulcanizing agent.

5. An apparatus of the class described comprising a core or mandrel provided with an inwardly-projecting flange, mold sections provided with registering cavities to inclose an article mounted on said mandrel arranged to engage a portion of said article on opposite sides of said flange, said mold sections each provided with a recess communicating with the cavity therein, a pervious member extending across each of said recesses for holding the portion of said article engaged thereby against distortion and means for introducing a vulcanizing agent to said recesses.

6. A tire-forming apparatus comprising a core or mandrel provided with an inwardly-projecting flange, a pair of mold sections having registering cavities to surround said mandrel, means for clamping said mold sections on said flange, each of said mold sections provided with a recess communicating with the cavity therein, a layer of pervious material extending across each recess for holding the portion engaged thereby against distortion during the vulcanization thereof and means for introducing a vulcanizing agent to said recesses.

7. A vulcanizing apparatus comprising a pair of sections adapted to be held together having registering grooves in their abutting faces constituting a mold cavity, each of said sections having a recess extending to said cavity provided with an inlet opening for a vulcanizing medium and a layer of pervious material across each recess adapted to sustain the portion of an article engaged thereby and permit the passage of said medium thereto.

8. A vulcanizing apparatus comprising a pair of sections adapted to be held together having registering grooves in their abutting faces constituting a mold cavity, each of said sections having a recess extending to said cavity provided with an inlet opening for a vulcanizing medium and a layer of pervious material across each recess of sufficient rigidity to hold the portion of an article engaged thereby against distortion and of sufficient porosity to permit the passage of a vulcanizing medium therethrough.

9. A vulcanizing apparatus comprising a pair of sections adapted to be held together having registering grooves in their abutting faces constituting a mold cavity, each of said sections having a recess extending to said cavity provided with an independent inlet opening for a vulcanizing medium and a layer of pervious material extending across each recess to sustain the engaged portion of an article and permit the passage of said medium thereto.

10. A vulcanizing apparatus comprising a pair of mold sections adapted to be held together, each of said mold sections provided with a steam chamber, said sections having registering grooves in their abutting faces constituting a mold cavity, each of said sections further provided with a recess extending to said cavity having an inlet opening for a vulcanizing medium and a layer of pervious material across each recess to sustain the portion of an article engaged thereby and permit the passage of said medium thereto.

11. A vulcanizing apparatus comprising a pair of mold sections adapted to be held together, both of said mold sections provided with a steam chamber each of which is capable of being independently heated, said sections having registering grooves in their abutting faces constituting a mold cavity, each of said sections having a recess extending to said cavity provided with an inlet opening for a vulcanizing medium and a layer of pervious material across each recess to sustain the portion of an article engaged thereby and permit the passage of said medium thereto.

12. A vulcanizing apparatus comprising a pair of mold sections adapted to be held together having registering grooves in their abutting faces constituting a mold cavity, each of said sections having a recess extended to said cavity provided with an inlet opening for a vulcanizing medium, a layer of pervious material extending across each recess to sustain the portion of an article engaged thereby, yet permitting the passage of said medium thereto and means for holding said layers of material in position.

13. A vulcanizing apparatus of the class described comprising a pair of mold sections adapted to be held together having registering grooves in their abutting faces constituting a mold cavity, each of said sections having a recess extending to said cavity provided with an inlet opening for a vulcanizing medium, and a layer of pervious material fashioned to conform to the shape to be imparted to the vulcanized article and extending across each recess to sustain the portion of an article engaged thereby yet permitting the passage of said vulcanizing medium thereto.

14. Apparatus of the class described comprising mold sections provided with registering cavities arranged to inclose a portion of an article to be vulcanized, each of said mold sections having a recess extending from said mold cavity and provided with an opening to admit a vulcanizing agent thereto, and a pervious covering for each recess for holding said article in shape during vulcanization and permitting said vulcanizing agent access thereto.

15. A vulcanizing apparatus comprising mold sections provided with registering cavities arranged to receive an article to be vulcanized, each of said cavities having a recess, a layer of pervious material covering said recess and fixedly secured to each mold section and means for introducing to said recesses a vulcanizing agent.

16. A vulcanizing apparatus of the class described comprising mold sections provided with registering cavities arranged to receive an article to be vulcanized, each of said sections having a recess, a layer of pervious material covering each recess and fixedly secured to its respective mold section, means for introducing to each recess a vulcanizing agent, and each section having a drainage opening for said recess.

17. A vulcanizing apparatus comprising mold sections provided with registering cavities arranged to inclose a portion of an article to be vulcanized, each of said sections provided with a recess, each of said mold sections further provided with a groove adjacent the recess formed therein, a member positioned in said groove, a layer of pervious material across each recess having one side secured in said groove by said member means for fixedly securing the other side of said layer to its respective section, and means for introducing to said recesses a vulcanizing agent.

18. A vulcanizing apparatus comprising mold sections provided with registering cavities adapted to surround a portion of an article to be vulcanized, each of said sections having a recess communicating the cavity formed therein, each of said mold sections further provided with a groove adjacent the recess formed therein, a holding member adapted to be seated in each of said grooves, holdfast means for said member, a layer of pervious material extending across each of said recesses, said members adapted to secure one side of the layers to said sections, means for securing the other side of said layers to said sections, and means to introduce a vulcanizing agent to said recesses.

19. A vulcanizing apparatus of the class described comprising mold sections provided with registering cavities adapted to surround a portion of an article to be vulcanized, each of said mold sections provided with a recess communicating with the cavity thereof and a groove adjacent the recess, each of said mold sections further provided with a second groove communicating with the first groove, an element positioned in each of said second mentioned grooves, a locking means in each of said first mentioned grooves and arranged when seated to lock said elements in said second mentioned grooves, layers of pervious material arranged to be secured in said second mentioned grooves by said elements and held in position by said locking members and extending across said recesses and means for introducing to said recesses a vulcanizing agent.

20. A vulcanizing apparatus of the class described comprising mold sections provided with registering cavities adapted to surround a portion of an article to be vulcanized, each of said mold sections provided with a recess communicating with the cavity thereof and further provided with a groove adjacent the recess, locking members arranged in said grooves, layers of pervious material having one side secured in said grooves by said locking members extending across said recesses and out of cavities, means arranged exteriorly of said sections for holding the opposite side of said layers and means for introducing to said recesses a vulcanizing agent.

21. A vulcanizing apparatus of the class described comprising mold sections provided with registering cavities adapted to surround a portion of an article to be vulcanized, each of said mold sections provided with a recess communicating with the mold cavity thereof, a layer of pervious material extending across each of said recesses and having one side secured to its respective mold section adjacent the recess therein, each of said layers having its other side extended out of the cavity of its respective mold section and lapping a portion of the exterior of said section, means for holding the lapping portions of said layers against movement, and means for introducing to said recesses a vulcanizing agent.

22. A vulcanizing apparatus comprising a plurality of mold sections each provided with means to constitute a steam space having an inlet, a lining of pervious material secured to each of said sections and constituting a wall for the steam space of its respective section and further constituting a component part of the mold section, each of said sections provided with a cavity, said cavities adapted to register and have the walls thereof surrounding a portion of the article to be vulcanized, said layers of pervious material further constituting a continuation of the walls of said cavities.

23. A vulcanizing apparatus comprising a mold formed of a plurality of sections, each of said sections having a layer of pervious material to permit of the passage of a vulcanizing medium, each of said layers secured to and forming a component part of its respective section, each of said layers being segment-shaped in cross-section.

In testimony whereof I have hereunto set my hand in presence of two subscribing witnesses.

JOHN K. WILLIAMS.

Witnesses:
C. E. HUMPHREY,
J. Ross HUFFMAN.